United States Patent Office 3,485,763
Patented Dec. 23, 1969

3,485,763
ION EXCHANGE MATERIALS AND THEIR
METHOD OF PREPARATION
Jean Lefevre, Vitry-sur-Seine, Jacques Prospert, Massy, and André Raggenbass, Wissous, France, assignors to Commissariat à l'Energie Atomique, Paris, France
No Drawing. Filed Feb. 12, 1965, Ser. No. 432,397
Claims priority, application France, Feb. 13, 1964, 963,717
Int. Cl. C02b 1/16, 5/04
U.S. Cl. 252—179                           5 Claims

ABSTRACT OF THE DISCLOSURE

This invention relates to ion exchanger materials which serve to fix ions of the caesium and rubidium type and to the method of preparing these materials. The ion exchanger is characterized in that it is composed of granular particles of a zirconium phosphate which contain a proportion of up to 60% by weight of a potassium or ammonium salt of a heteropolyacid such as phosphotungstic or phosphomolybdic acid. The ion exchange materials are prepared by incorporating in zirconium phosphate a proportion of up to 60% by weight of a potassium or ammonium salt of a heteropolyacid by precipitation of said phosphate in said salt.

---

The present invention will be more readily understood from a perusal of the description which now follows.

It is known that zirconium phosphate which is prepared in the form of granular particles can be utilized in ion exchange columns and that it fixes caesium slowly and incompletely. This fixation is particularly slow and incomplete in an acid medium.

It is also known that the caesium salts of phosphotungstic acid and phosphomolybdic acid are very insoluble. Consequently, if less insoluble precipitates of salts of said acids are put in the presence of solutions containing caesium ions, these latter are exchanged with the cations of said salts.

Experience has shown that this exchange process takes place equally well in an acid medium and in a neutral medium. In point of fact, the salts of phosphotungstic acid and phosphomolybdic acid, in particular those of ammonium and potassium, occur in the form of very fine grains, with the result that they cannot be directly utilized in ion exchange columns and, in addition, said salts dissolve in normal nitric acid in a proportion of 1 g. per liter.

There is therefore made available on the one hand a first substance which can be employed in an ion exchange column but which has a poor caesium-fixation capacity and, on the other hand, a second substance which has a good caesium-fixation capacity but which cannot be employed in an ion exchange column.

In order to eliminate these disadvantages, an ion exchanger, especially for caesium-ion exchange, is composed according to the invention of zirconium phosphate in the form of granular particles and containing a proportion of up to 60% of an ammonium or potassium salt of phosphotungstic acid or phosphomolybdic acid.

The granular particles referred to above are suitable for use in an ion exchange column and permit of caesium fixation in all media up to a pH value of the order of 8 to 9. Above this pH value, either dissolution or hydrolysis of the ion exchanger would be observed.

The ammonium or potassium salts of phosphotungstic or phosphomolybdic acid which are especially soluble in nitric acid have negligible solubility when they are incorporated in granular particles of zirconium phosphate.

Thus, whereas the solubility of zirconium phosphate in 1 N HNO$_3$ is zero and the solubility of ammonium phosphotungstate or phosphomolybdate alone is equal to 2%, the solubility of said phosphotungstate or said phosphomolybdate when incorporated in the granular particles of zirconium phosphate is only equal to 0.25%.

In order to manufacture the above-mentioned caesium-ion exchanger, it is possible, for example, to prepare first of all an aqueous suspension of ammonium phosphotungstate or ammonium phosphomolybdate. Zirconium phosphate is then precipitated in the midst of said suspension by adding simultaneously phosphoric acid and a solution of a soluble salt of zirconium, for example zirconyl chloride. The precipitate obtained is granular.

The quantity of zirconium ion employed per liter of suspension is usually less than 18 g. and the phosphoric acid, the concentration of which is preferably within the range 1 N to 6 N, is added in excess, for example in a quantity which can amount to double that which is theoretically necessary.

There will be given hereinafter a number of different examples of application of an ion exchanger in accordance with the invention. The practical arrangements which will be described in connection with these examples must be considered as forming part of the invention, it being understood that any equivalent arrangements could equally well be adopted without thereby departing from the scope of this invention.

An ion exchanger has been prepared which contained 20% ammonium phosphotungstate and an ion exchanger containing respectively 15, 20 and 30% of ammonium phosphomolybdate.

EXAMPLE 1

There is prepared a suspension of ammonium phosphotungstate by intimately mixing 3.133 g. of phosphotungstic acid and 0.3 g. of ammonium nitrate in 500 ml. of water. While stirring powerfully, there are simultaneously added in said suspension 84.5 ml. of 4 N phosphoric acid and 250 ml. of a solution of zirconyl chloride in a proportion of 16.5 g./l.

The precipitate is allowed to settle, is then washed with 0.1 N nitric acid before being dried at a temperature in the vicinity of 110° C.

The caesium-ion exchanger, which is constituted by the granular particles thus obtained, is then ready for use and can be regenerated after use by elution of the caesium ions with the aid of an ammonium salt, for example ammonium nitrate which is five times molecular. This regeneration treatment can be renewed a large number of times.

By means of the ion exchanger according to the invention, the caesium which is contained in a solution can be fixed much more rapidly and completely than is the case when zirconium phosphate is employed alone. In other words, the caesium distribution coefficient between the exchanger and the solution which is passed through the exchanger and which is commonly designated as K$d$ (and also referred-to as the equilibrium coefficient or ratio of the concentration of caesium fixed on the ion exchanger to the concentration of caesium which has remained in solution) is improved to an appreciable extent in the case of the ion exchanger according to this invention.

In order to illustrate the foregoing, 20 ml. of a solution of fission products containing caesium were contacted with 0.5 g. of ion exchanger which consisted in the first case only of zirconium phosphate and, in the second case, of zirconium phosphate and ammonium phosphotungstate. The results of measurements of the K$d$ coefficient as a function of time are grouped in the table given below and give conclusive evidence of distinctly improved exchange as achieved by means of the ion exchanger according to this invention, as well as a higher rate of exchanger.

| $Kd$ in respect of an ion exchanger of Zr phosphate alone | $Kd$ in respect of an ion exchanger in accordance with the invention | Time in hours |
| --- | --- | --- |
| 3.9 | 9.0 | 1 |
| 6.8 | 27.8 | 19 |
| 7.9 | 36.7 | 22.5 |
| 7.9 | 40.0 | 26 |

EXAMPLE 2

There is prepared a suspension of ammonium phosphomolybdate by mixing 3 g. of phosphomolybdic acid and 0.45 g. of ammonium nitrate in 500 ml. of water. While subjecting to a powerful stirring action, there are simultaneously added to this suspension 85 ml. of 4 N phosphoric acid and 250 ml. of a solution of zirconyl chloride in a proportion of 16.5 g./l.

The precipitate is allowed to settle, then washed with 0.1 N nitric acid before being dried at a temperature in the vicinity of 110° C.

20 ml. of a solution of fission products as defined in Example 1 were contacted with 0.5 g. of the ion exchanger as thus prepared. The results of measurements of the $Kd$ coefficient as a function of time are recorded in the table hereunder.

| $Kd$ in respect of an ion exchanger of Zr phosphate alone | $Kd$ in respect of an ion exchanger containing 15% ammonium phosphomolybdate | Time in hours |
| --- | --- | --- |
| 3.9 | 15.3 | 1 |
| 6.8 | 47.2 | 19 |
| 7.9 | 62.3 | 22.5 |
| 7.9 | 68 | 26 |

EXAMPLE 3

There is prepared a suspension of ammonium phosphomolybdate by intimately mixing 4.5 g. of phosphomolybdic acid and 0.6 g. of ammonium nitrate in 500 ml. of water. While powerfully stirring, there are simultaneously added in this suspension 85 ml. of 4 N phosphoric acid and 250 ml. of a solution of zirconyl chloride in a proportion of 16.5 g./l.

The precipitate is allowed to settle then washed with 0.1 N nitric acid before being dried at a temperature in the vicinity of 110° C.

20 ml. of a solution of fission products as defined in Example 1 were contacted with 0.5 g. of the ion exchanger as thus prepared. The results of measurements of the $Kd$ coefficient as a function of time are recorded in the following table:

| $Kd$ in respect of an ion exchanger of Zr phosphate alone | $Kd$ in respect of an ion exchanger containing 20% ammonium phosphomolybdate | Time in hours |
| --- | --- | --- |
| 3.9 | 28.1 | 1 |
| 6.8 | 86.8 | 19 |
| 7.9 | 114.6 | 22.5 |
| 7.9 | 125 | 26 |

EXAMPLE 4

There is prepared a suspension of ammonium phosphomolybdate by intimately mixing 6 g. of phosphomolybdic acid and 0.9 g. of ammonium nitrate in 500 ml. of water.

While stirring, there are simultaneously added in this suspension 85 ml. of 4 N phosphoric acid and 250 ml. of a solution of zirconyl chloride in a proportion of 16.5 g./l.

The precipitate is allowed to settle, then washed with 0.1 N nitric acid before being dried at a temperature in the vicinity of 100° C.

20 ml. of a solution of fission products as defined in Example 1 are contacted with 0.5 g. of ion exchanger as thus prepared. The results of measurements of the $Kd$ coefficient as a function of time are recorded in the table below:

| $Kd$ in respect of an ion exchanger of Zr phosphate alone | $Kd$ in respect of an ion exchanger containing 30% ammonium phosphomolybdate | Time in hours |
| --- | --- | --- |
| 3.9 | 47.25 | 1 |
| 6.8 | 145.9 | 19 |
| 7.9 | 192.7 | 22.5 |
| 7.9 | 210 | 26 |

It is apparent from a comparison of the different examples given above that a generally higher $Kd$ coefficient is obtained in the case of the ion exchanger which contains ammonium phosphomolybdate and that the effectiveness of this ion exchanger is all the more marked as the proportion of ammonium phosphomolybdate is higher.

One application of ion exchangers according to this invention which is of particular interest consists in treating solutions which contain a high proportion of barium as well as caesium. The results which are achieved in this case are distinctly superior to those which are obtained by means of ion exchangers which consist solely of zirconium phosphate.

There have been grouped in the table below the results obtained when equal quantities of a same solution which is highly charged with barium are contacted with an ion exchanger consistong of zirconium phosphate alone and with an ion exchanger according to this invention which contains 20% ammonium phosphotungstate.

| $Kd$ in respect of an ion exchanger of zirconium phosphate | $Kd$ in respect of an ion exchanger containing 20+ ammonium phosphotungstate | Time in hours |
| --- | --- | --- |
| 366 | 739 | 1 |
| 494 | 895 | 2 |
| 865 | 895 | 19 |

It is found that equilibrium is reached at a speed which is nearly ten times faster in the case of the ion exchanger according to the invention.

It is possible to recover the barium, which appears to be fixed primarily by the zirconium phosphate, by eluting with a dilute acid which does not desorb caesium. The caesium can then be recovered as indicated earlier by eluting with ammonium nitrate which is five times molecular.

The ion exchanger in accordance with the invention also fixes under the same conditions the rubidium which is present with caesium in fission products in a proportion of 10% by weight with respect to the weight of caesium. The rubidium can be eluted selectively.

What we claim is:

1. An ion exchange material consisting essentially of granular particles of zirconium phosphate having incorporated therein from 15 to 60% by weight of a salt of a heteropolyacid selected from the group consisting of the potassium salt of phosphomolybdic acid, the ammonium salt of phosphomolybdic acid, the potassium salt of phosphotungstic acid and the ammonium salt of phosphotungstic acid.

2. A material according to claim 1 wherein the salt of said heteropolyacid is the potassium salt of phosphomolybdic acid.

3. A material according to claim 1 wherein the salt of said heteropolyacid is the potassium salt of phosphotungstic acid.

4. A material according to claim 1 wherein the salt of said heteropolyacid is the ammonium salt of phosphomolybdic acid.

5. A material according to claim 1 wherein the salt of said heteropolyacid is the ammonium salt of phosphotungstic acid.

References Cited

UNITED STATES PATENTS

| | | | |
|---|---|---|---|
| 2,877,094 | 3/1959 | Khym | 210—38 |
| 2,970,035 | 1/1961 | Stoughton | 23—14.5 |
| 3,056,647 | 10/1962 | Amphlett | 23—14.5 |
| 3,243,258 | 3/1966 | Smit | 210—38 |

LEON D. ROSDOL, Primary Examiner

W. SCHULZE, Assistant Examiner

U.S. Cl. X.R.

23—51; 210—38, 51, 59; 252—301.1